Patented Apr. 14, 1931

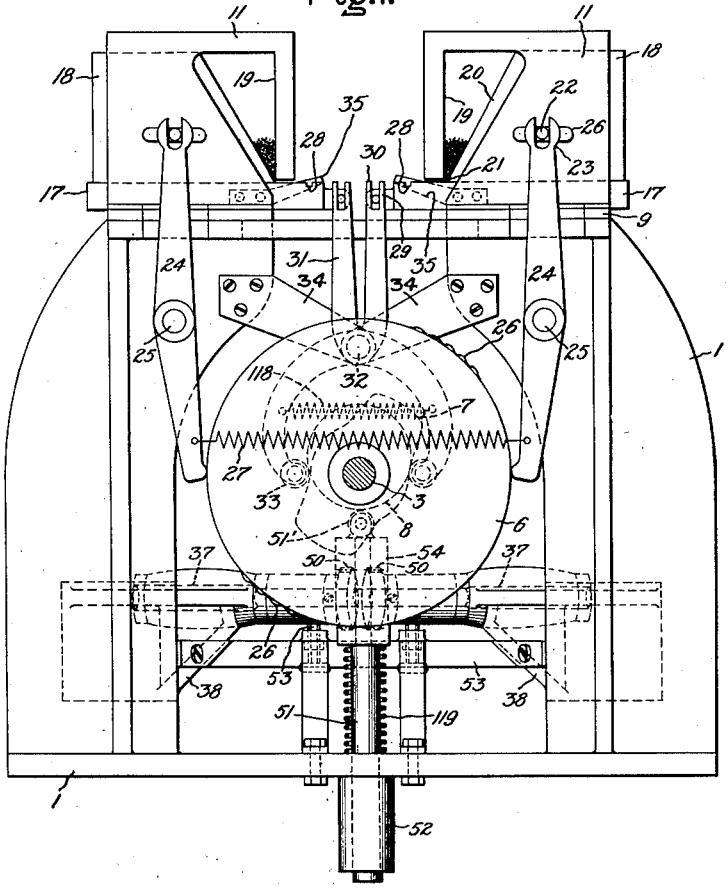

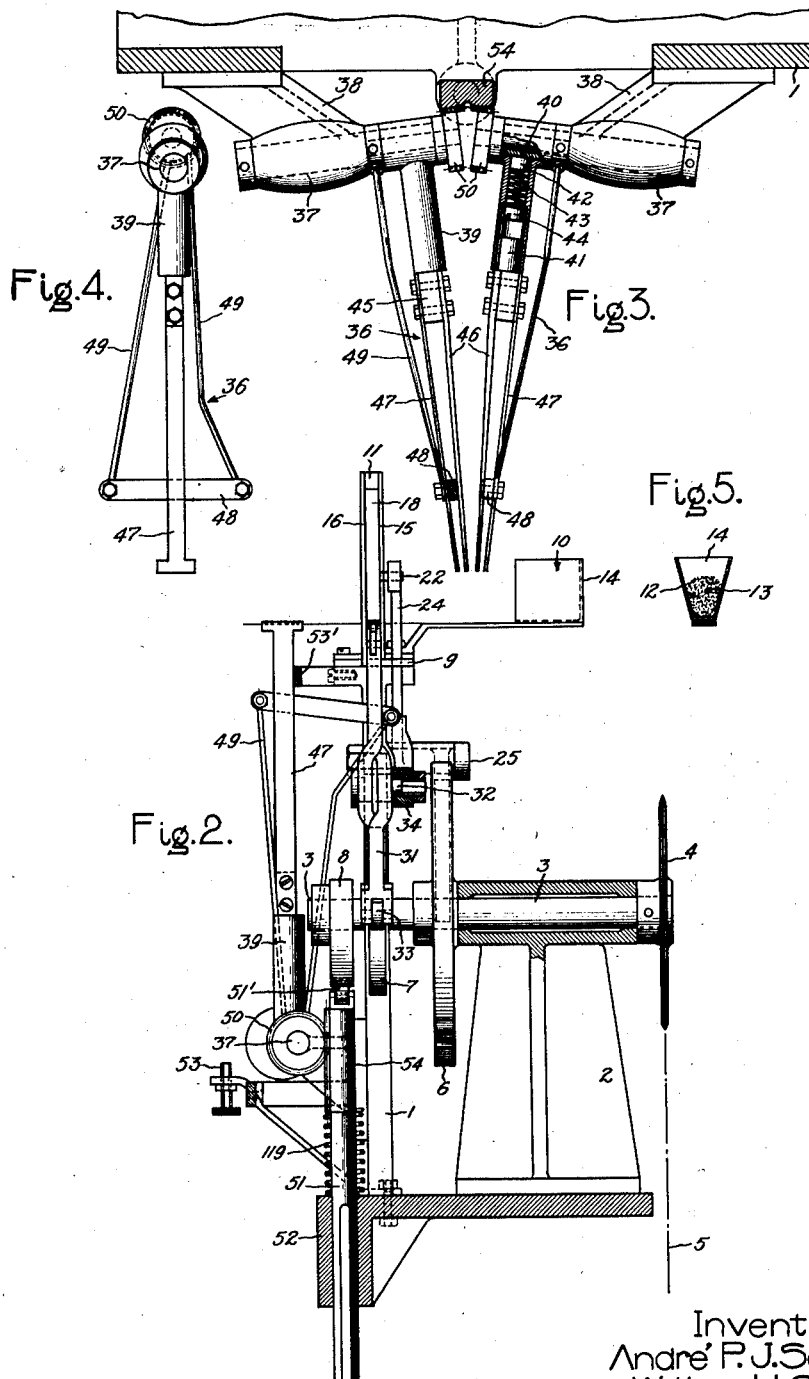

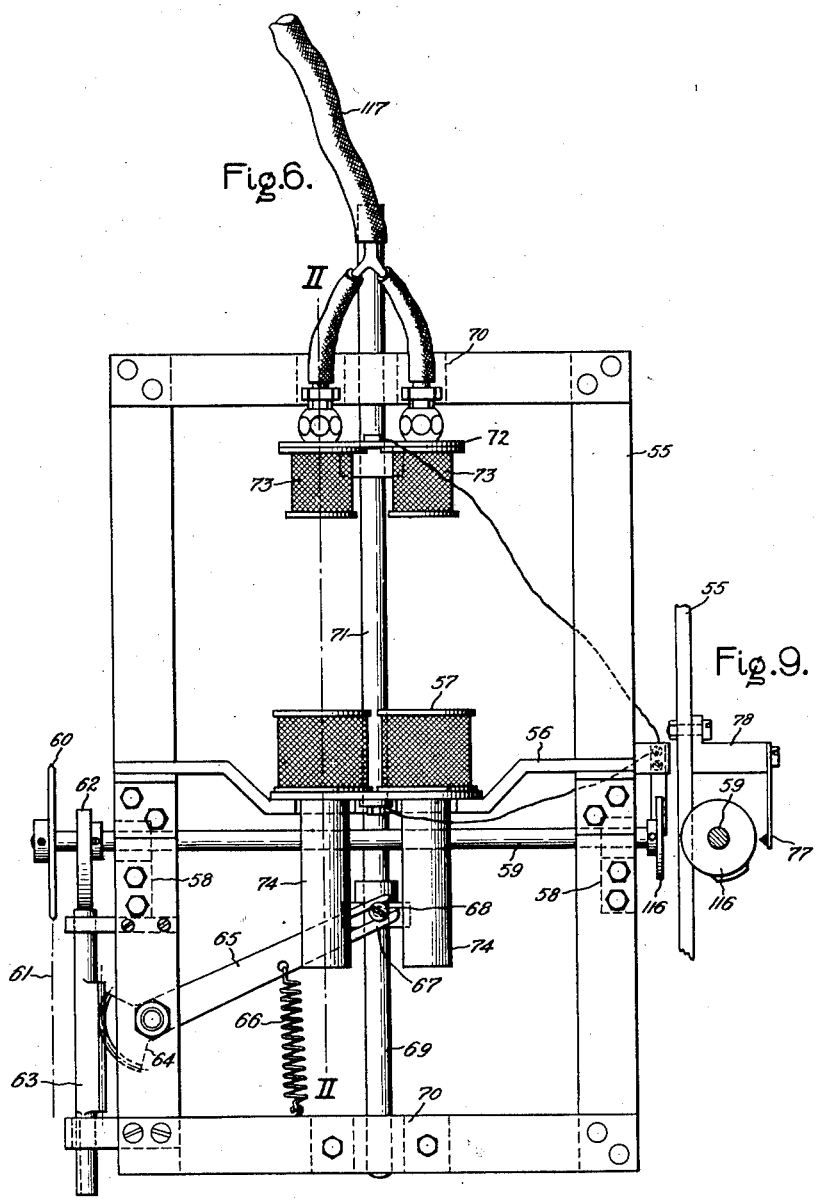

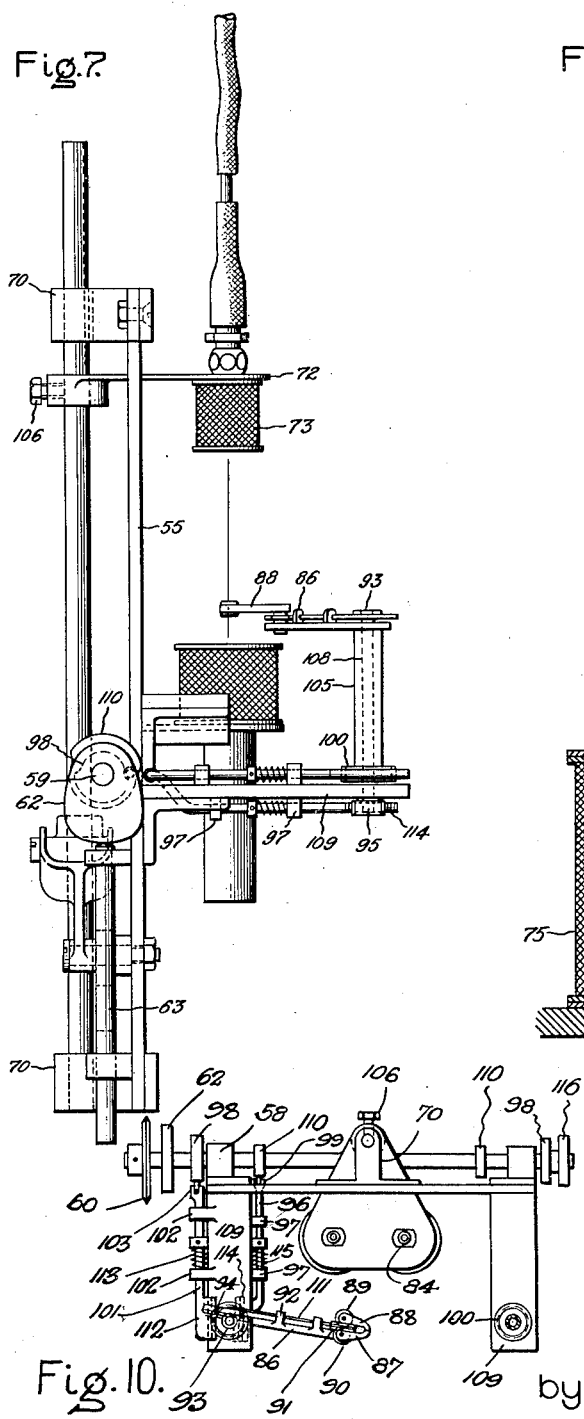
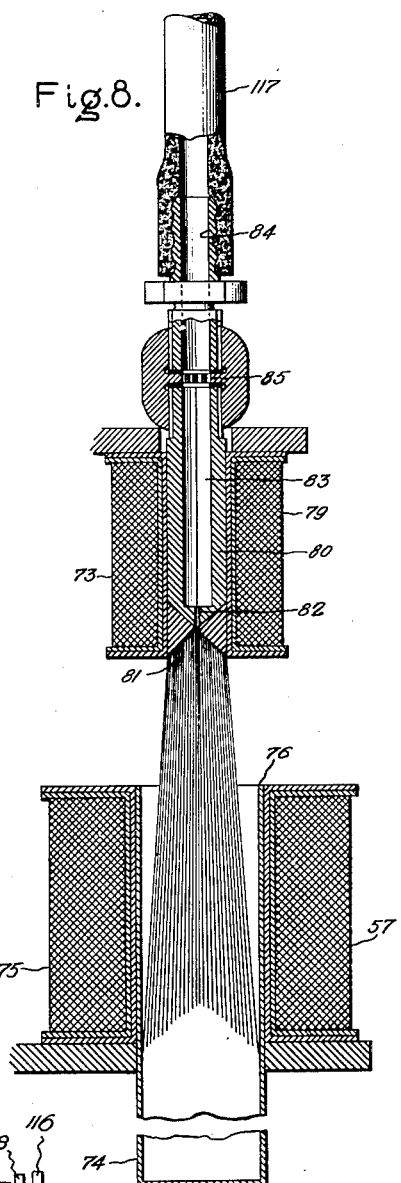

1,801,119

UNITED STATES PATENT OFFICE

ANDRÉ PAUL JAN SOEPNEL AND WILLEM HENDRIK STIGTER, OF EINDHOVEN, NETHERLANDS, ASSIGNORS TO GENERAL ELECTRIC COMPANY, A CORPORATION OF NEW YORK

WIRE-FEEDING MECHANISM

Application filed February 16, 1926, Serial No. 88,691, and in the Netherlands February 24, 1925.

This invention relates to means for picking one or more wires out of a mass of loose wires and more particularly to picking up leading-in wires automatically and positioning them correctly in the press of stems for incandescent lamps and similar devices.

Apparatus is already known which automatically feeds homogeneous leading-in wires of indefinite length and which also cuts it into wires of the required length. This apparatus cannot be used, however, for leading-in wires which are not homogeneous throughout their entire length such as the leading-in wires known as "welds" and consisting of a short length of wire for making a hermetical seal with glass and welded to another wire of different metal such as copper.

One object of this invention is to supply automatically a predetermined number of wires from a mass or bundle of loose wires of definite length. A device constructed according to this invention comprises mechanism to separate one or more of the wires from the mass and other mechanism to pick up separately each one of the separated wires.

The mechanism to separate one or more wires from the mass may consist of one or more feed members with one or more notches and is attached to the outlet of the hopper for the mass of wires. The feed members separate one or more wires from the mass and take the separated wires to a place where they are picked up by the pick-up mechanism. In this way every time that one notch is underneath the hopper one of the wires from the mass in the hopper is separated and taken along with the feed member. In a practical form of a device according to the invention one or more feed members or rods provided with one or more notches can move horizontally in an outlet opening in the bottom of the hopper.

To insure good operation of a device constructed according to the invention, the mass of wires may be agitated. This may be done by making one of the walls of the hopper for the mass of wires movable, and reciprocating this wall by means of a lever or similar apparatus. The place to which the wires are conveyed by the notched feed members to be picked up has by preference an inclined surface by which the wires are lifted out of the notches. In this way the wires come into a suitable position where they can be seized by the pick up mechanism.

If the wires consist entirely or partly of magnetic material, the separation can be brought about according to the invention by means of one or more magnets. These magnets draw a bundle of loose wires to a plate in which there is a hole through which only the required number of wires can pass. Devices are provided to draw through the hole and hold the wires that come in front of the hole. These devices may be made in such a way that the plate with the hole is located in a magnetic field by means of which a certain number of wires are drawn through the hole. Another way, according to the invention, is to draw the wires through the hole by means of a vacuum which pulls them through the hole.

The wires can be drawn to the perforated plate, which is located in the magnetic field, by this same magnetic field, or by a separate magnet. It is also desirable to excite the magnetic field intermittently. In this way the wires will drop back into their original position after having been drawn to the plate and after one or more of the wires have been separated from the others. In order to prevent the separated wire from dropping back with the others when the magnetic field is removed some means, such as a vacuum, may be provided to hold the wire in the hole.

In one practical form of the invention a bundle of wires is drawn from a hopper to the core of an electromagnet which is excited intermittently by a coil. In the core there is a hole and the intermittently excited electromagnet attracts a bundle of wires to the end of the core. This arrangement has the advantage of concentrating the bundle of wires on the end of the core, so that there will always be at least the required number of wires in front of the hole. In order to make the concentration of the bundle of wires still greater there may be in the end of the core a conical recess having at the center a hole through which only a certain number of wires can pass.

Furthermore, it is advantageous to provide means by which the coil and the electromagnet are moved to and from each other periodically. The coil and the electromagnet can be excited at the moment that they are nearest to each other. The distance between them can be made greater when the magnetic field is removed, and the separated wire can then be reached more easily by the pick-up device.

A device constructed according to the invention has special advantages when it is applied to a machine for the manufacture of filament mounts of incandescent lamp and similar apparatus. In such a machine a stem tube, a glass rod, and an exhaust tube are fused together after having the leading-in wires and the supporting wires for the filament or the electrodes inserted in the stem tubing. This inserting may be done by mechanism comprising one or more devices for selecting the leading-in wires and the filament supports out of one or more bundles, and means for picking up these selected wires and positioning them in the right place inside the stem tubing.

The invention will be explained by reference to the attached drawing, in which an example is given of a device for supplying the leading-in wires for stems for incandescent lamps, and in which, Fig. 1 is a front view of the device by which the wires are fed one at a time by reciprocating feed members; Fig. 2 is a side view, partly in cross section, of the device shown in Fig. 1; Figs. 3 and 4 show details of the pick-up mechanism; Fig. 5 is a front view of one of the hoppers for the wires; Fig. 6 is a front view of a device for selecting by electromagnets one or more wires of magnetic materials from a mass of wires; Fig. 7 is a side view of the device shown in Fig. 6; Fig. 8 is a cross section along the line 11—11 in Fig. 6; Fig. 9 is a detail of the contact mechanism which closes and opens the circuit through the windings of the electromagnets; and Fig. 10 is a plan view of the pick-up mechanism.

In this drawing Figs. 1 and 2 show a frame 1 to which a pedestal 2 is attached. This pedestal supports a cam-shaft 3, which is driven by a sprocket wheel 4 and a chain 5 and to which cams 6, 7, and 8, are keyed to actuate the various mechanism. The wire separating mechanism comprises a plate 9 which is supported by the frame 1 and carries the hoppers 10 and 11 for holding a mass of loose wires. Each hopper has two inclined walls 12 and 13 (Fig. 5) and is closed on one side by a wall 14. Each hopper 11 consists of two side plates 15 and 16 between which there is a movable feed rod 17, surmounted by a plate 18. Each side plate 15 and 16 has a triangular window 19 (Fig. 1) and the plate 18 is placed in such a position that its edge 20 together with the edges of the windows 19 forms a hopper. The edges 19 and 20 slope toward each other, but do not meet, leaving at the bottom a space 21 through which a single wire can drop on the feed rod 17. The plate 18 has a pin 22 which can move in a slot 26 of the plate 15, and is engaged by the forked end 23 of a lever 24 which can rock on a pivot 25 on the frame 1. The other end of the lever 24 presses against the cam 6 on the shaft 3. The cam 6 has such a shape that its elevation 26 gives a vibrating motion to the lever 24 against the tension of a spring 27, thereby making the plate 18 move back and forth and shake the mass of wires held between the edges 19 and 20.

To separate a wire from the mass in the hopper each feed rod 17 has a notch 28 and on its end carries a pin 29 engaged by a fork 30 which is part of a lever 31 rotatable on a pivot 32 carried by supports 34 on the frame 1. Each lever 31 carries a roller 33 which presses against a cam 7 on the shaft 3, and when the cam rotates it moves both the levers 31 against the tension of a spring 118. This causes the feed rods 17 to move forward and back. Because of this motion of the feed rods 17, every time the notch 28 comes underneath the hopper 11 it receives a wire out of the hopper. The feed rod 17 carries the wire beneath the plates 15 and 16, and as it moves further the wire is lifted out of the notch by a finger 35.

The wire is carried by the feed rod 17 to a place where it can be caught by the pick-up mechanism, comprising a clamp 36 that can rotate on a shaft 37 (Figs. 3 and 4) supported by pedestals 38 bolted to the frame 1. The clamp 36 consists of a tubular member 39 which can rotate on a tube 40 which is keyed on the shaft 37. It has a bore 41 containing a movable piece of steel 42 which is pressed against the tube 40 by means of a spring 43. The tension of the spring can be regulated by a set screw 44. The tubular member 39 also has a projection 45 to which two clamping fingers 46 and 47 are attached. The finger 46 is rigid and the finger 47 is pressed against the finger 46 by its own elasticity. A wedge 48 which is attached to the arms 49 can move between those fingers. The arms 49 are mounted on the tube 40 which carries a pinion 50 keyed to the shaft 37. The pinion 50 is driven by a rack 54 which is a part of the rod 51 (Figs. 1 and 2) which is in turn held in a vertical position by guide 42. The upper end of the rod 51 carries a roller 51' which presses against a cam 8 which is keyed on the shaft 3. In this way the rack 54 is moved up and down vertically each time against the tension of the spring 119 and causes the pinion 50 and also the tube 40 to rotate. When the clamp is in the position shown in Fig. 2, that is, when one of the leading-in wires is caught in the clamp, rack 54 is moved upwardly causing the rotation of wedge 48 by tube 40 and clamping fingers 46 and 47 through the frictional engagement between the piece of steel 42 and the tube 40. The wedge and the clamping fingers, therefore, do not change their position with regard to each other and the clamping fingers remain closed and carry the wire along.

To release the picked up wire the frame 1 has a stop 53 which is adjustable and which stops the member 39 thereby preventing the clamps from rotating further. The rotation of the tube, however, continues and therefore the wedge also continues moving, opening up the clamping fingers 46 and 47. The wire is thereupon released and dropped into the required position by means of a device made for that purpose.

When the rack moves down the tube 40 will turn back. The wedge and the clamping fingers will, therefore, move at the same time with the result that the clamping fingers will not close during the rotation. Finally the clamping fingers will hit the stop 53 on the frame 1 and come into the position in which they can catch the wire that has been in the meanwhile separated from the mass in the hopper. The wedge will move further and the clamping fingers will close.

A device for selecting wires of magnetic material by means of magnets is shown in the Figures 6, 7, 8, 9 and 10.

A frame 55 (Fig. 6) supports the pedestals 58 on which a cam shaft 59 can rotate. This cam shaft is driven by means of a sprocket wheel 60 and chain 61 and carries the cams 62, 116, 98 and 110 (Figs. 7 and 10) which actuate the various mechanisms. The cam 62 moves a rack 63 which meshes in a sector of a pinion 64, which is a part of a lever 65 which engages with its forked end 67 a pin 68. This pin is fastened to a rod 71 which slides in guides 70. The rod 71 carries a crossbar 72 to which the electromagnets 73 are so attached that they can be adjusted to various heights by a set screw 106 (Fig. 7). The cam 62 moves the rack and the sector of the pinion against the tension of a spring 66. This causes the rod 71 to move up and down which makes the magnets 73 move to and from the magnets 57 periodically. The magnets 57 are fastened to the support 56 to which also the cups 74 are fastened.

The magnets 57 and 73 are excited by current in a circuit which is closed and opened by means of a cam 116 (Fig. 9) and a contact 77. This contact is fastened to a support 78 which is insulated from the frame 55.

At the moment that the magnets 57 and 73 (Fig. 8) are near to each other the current is sent through the windings 75 and 79 of those magnets making a strong magnetic field which lifts the wires up out of the cups 74 to the core 80 of the magnet 73. In the center of the end of this core there is a conical depression 81 in which there is a hole 82 which is just large enough for one wire to pass through and which also communicates with the space 83. This space 83 is connected to a vacuum exhaust tube 117. The wires that have been attracted to the end 81 of the magnet will be contracted in front of the hole 82 on account of the magnetic force and of the conical form of the depression. One of the wires will be drawn through the hole either by the magnetic field or by the vacuum. In order to prevent the wire being drawn too far into the tube a stop 85 is provided in the space 83. The wire hits against it and part of it stays outside of the hole. When the circuit is open the bundle of wires will fall back again in the holder except for the wire which is in the hole of the core which will be held by the vacuum. Then the pick-up device can catch the wire.

To facilitate the picking up of the selected wire the supports 109 (Figs. 7 and 10) are fastened to the frame 55 and carry two catching devices, consisting of rotatable arms 86 on which the jaws 87 and 88 can rotate. These jaws are mounted on small pinions 89 and 90 that mesh in the rack 91. This rack is rigidly connected to a rod 111 which can move back and forth through the supports 92 of the arm 86. By this reciprocating motion the jaws 87 and 88 will be opened and closed. A rack 94 is attached to the other end of the rod and meshes in a pinion 93 which is mounted on a shaft 108 which rotates in a pedestal 109. Underneath the shaft 108 there is a pinion 95 which is actuated by a rack 114. The rack 114 is attached to a rod 96 which is guided by the guides 97 and the roller 99 of which is pressed against a cam 110 by the spring 115. When the roller is not touching the cam 110 this spring will keep the jaws 88 and 87 closed continuously. The arm 86 is rigidly connected to the tube 105, which has a pinion 100 actuated by a rack 112 which is connected to a rod 101. This rod 101 is guided in the guides 102 and has a roller 103 pressing against a cam 98. This cam moves the rod and the rack against the tension of the spring 113.

The pick-up device works as follows:

After one of the wires has been drawn through the hole 82 the cam 110 moves the rack 114 to the right (Fig. 7). This causes the jaws 88 and 87 to close, catching the free end of the wire. After this the magnets 73 are moved up and the wire will be pulled out of the hole by the jaws. Then the cam 98 acutates the rack 112 which causes the arms 86 to rotate and to carry the wire to the desired place. During this motion the roller 99 runs off the cam 110 and the jaws will remain closed by the tension of the spring 115. When the wire arrives at the desired place the jaws will be opened by the cam 110. After this the arms are moved back again to the place where they pick up the wires from the magnets.

It will be understood that the invention is not confined to the example which is described, but that many variations can be applied to the construction, all of which will be covered by the claims of the invention.

What we claim as new and desire to secure by Letters Patent of the United States, is:

1. In a device of the character described, the combination of feed mechanism comprising, means for producing a magnetic flux concentrated on an individual wire to separate it from a loose mass of wires, pick-up mechanism for picking up each separated wire individually, and common actuating means for said mechanisms.

2. In a device of the character described, the combination of a pick-up mechanism for picking up individual wires, a feed mechanism for separating an individual wire from a loose mass of wires comprising a hopper with an outlet for said loose mass and a notched feed member movable across said outlet to separate an individual wire from the mass in the hopper and carry it within range of said pick-up mechanism and common actuating means for said mechanisms and said feed member.

3. In a device of the character described, the combination of a pick-up mechanism and a feed mechanism comprising a hopper for holding a loose mass of wires and having an outlet, a reciprocating feed rod provided with a notch and movable to carry said notch across the outlet of said hopper to separate an individual wire from the mass in the hopper and carry it within range of said pick-up mechanism, and common actuating means for said mechanism and said feed rod.

4. In a device of the character described, the combination of a pick-up mechanism and a feed mechanism comprising a hopper for holding a loose mass of wires and having an outlet, means for agitating the mass of wires in said hopper, a feed member cooperating with said outlet to separate individual wires from the mass in said hopper and carry them within range of said pick-up mechanism and means for actuating said mechanism and said feed members in synchronism.

5. In a device of the character described, the combination of a pick-up mechanism for individual wires, a feed mechanism for a loose mass of wires comprising a hopper having an outlet and a movable wall, a notched feed member cooperating with said outlet to separate individual wires from the mass in the hopper, and common actuating means for actuating said pick-up mechanism and said feed member, and for moving said movable wall of the hopper.

6. In a device of the character described, a feed mechanism comprising a hopper for a loose mass of wires and having an outlet, a movable notched feed member cooperating with said outlet to separate individual wires from said mass in the hopper and carry them to a delivery point, and an inclined delivery member mounted adjacent the path of said feed member in position to lift the separated wire out of the notch in said feed member at the delivery point.

7. In a device of the character described, a feed mechanism for separating individual wires from a loose mass of wires comprising a perforated member and means for producing a magnetic field to draw the ends of a bundle of wires to said member and further draw an individual wire through the perforation in said member.

8. In a device of the character described, a feed mechanism for separating individual wires from a loose mass of wires of magnetic material comprising a member perforated by a hole of a bore slightly larger than one of said wires, and means for producing a magnetic field which will draw the ends of said wires into engagement with said member and one of said wires into the hole in said member.

9. In a device of the character described, a feed mechanism for separating individual wires from a loose mass of wires comprising a perforated plate, means for producing a magnetic field for drawing the ends of said wires to said plate, and a vacuum connection to the perforation in said plate.

10. In a device of the character described, a feed mechanism for separating individual wires from a loose mass of wires comprising a plate perforated by a hole slightly larger than the wires, a magnet adjacent said plate to produce a magnetic field which will draw the ends of said wires to said plate, a vacuum connection to the hole in said plate, and means for alternately exciting said magnet and producing a vacuum in said connection.

11. In a device of the character described, a feed mechanism for loose wires comprising an electromagnet having a core with a longitudinal hole slightly larger than the diameter of a wire, a coil in inductive relation to said core, and means for intermittently energizing said coil to produce a magnetic field which will attract the wires to said core and pull one of them into the hole in said core.

12. In a device of the character described, a feed mechanism for loose wires comprising an electromagnet having a core with a conical recess in its end and a hole at the bottom of the recess slightly larger than the diameter of one of said wires, and means for energizing said electromagnet to produce a magnetic field which will draw the ends of a bundle of said wires into said conical recess and further draw one of said wires into said hole.

13. In a feed mechanism of the character described for feeding loose wires, the combination of an electromagnet having a core with a longitudinal hole slightly larger than the diameter of one of the wires, a coil mounted to be movable toward and away from said electromagnet, and means for periodically moving said core and said electromagnet toward and away from each other and intermittently exciting said coil and said electromagnet to produce a magnetic field which attracts the wires to the end of the core of the electromagnet and also draws one of said wires into said hole.

14. In a device of the character described the combination of a pick up mechanism for picking up individual wires, a feed mechanism for separating an individual wire from a loose mass of wires comprising a hopper for the mass of wires, means for selecting and lifting an individual wire from the mass of wires in said hopper and bringing it within the range of said pick up mechanism, and common actuating means for said mechanisms.

15. In a device of the character described, the combination of a pick up mechanism for picking up individual wires, a feed mechanism for separating an individual wire from a loose mass of wires comprising a hopper for the mass of wires, a wire selector member for selecting and lifting an individual wire from the mass of wires in said hopper and movable to carry said selected wire within range of said pick up mechanism, and common actuating means for said pick up mechanism and said selector member.

16. In a device of the character described, a feed mechanism for separating individual wires from a loose mass of wires comprising collecting means for assembling from said mass a plurality of wires and holding said assembled wires loosely side by side in a bundle, selecting means for lifting some of said wire lengthwise from said bundle, and common actuating mean for operating said collecting means and said selecting means in sequence.

17. In a device of the character described a feed mechanism for separating individual wires from a loose mass of wires comprising collecting means for producing a magnetic field to lift from said mass a plurality of wires in a loose bundle, selecting means for engaging the end of said bundle to extract some of said wires from said bundle, and common actuating means for operating said collecting means and said selecting means in sequence.

18. In a device of the character described, a feed mechanism for separating individual wires from a loose mass of wires comprising wire selecting means for drawing a wire endwise from a loose bundle of wires, collecting means for gathering from said mass a loose bundle of wires with the end of said bundle in operative relation to said selecting means and common actuating means for actuating said collecting means and said selecting means in sequence.

19. In a device of the character described, the combination of means for holding loose wires side by side in a mass, and means comprising an outlet and a magnet adjacent said outlet for selecting and drawing an individual wire of said mass endwise from said mass.

20. In a device of the character described, the combination of a wire holder having an outlet and constructed to hold wires side by side in a loose mass with their ends adjoining said outlet, and means for exerting traction on an individual wire to draw it endwise from said mass through said outlet.

In witness whereof, we have hereunto set our hands this 28th day of January, 1926.

ANDRÉ PAUL JAN SOEPNEL.
WILLEM HENDRIK STIGTER.